US012576633B2

(12) United States Patent
Korthuis et al.

(10) Patent No.: US 12,576,633 B2
(45) Date of Patent: Mar. 17, 2026

(54) MATCHING ELECTRICALLY CONDUCTIVE LINE RESISTANCES TO SWITCHES IN FLUIDIC DIES

(71) Applicant: Hewlett-Packard Development Company, L.P., Spring, TX (US)

(72) Inventors: Vincent C. Korthuis, Corvallis, OR (US); Rogelio Cicili, San Diego, CA (US); Eric T. Martin, Corvallis, OR (US); Kellie Susanne Jensen, Corvallis, OR (US); James R. Przybyla, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 224 days.

(21) Appl. No.: 18/266,803

(22) PCT Filed: Jan. 11, 2021

(86) PCT No.: PCT/US2021/012941
§ 371 (c)(1),
(2) Date: Jun. 12, 2023

(87) PCT Pub. No.: WO2022/150048
PCT Pub. Date: Jul. 14, 2022

(65) Prior Publication Data
US 2024/0051292 A1 Feb. 15, 2024

(51) Int. Cl.
*B41J 2/045* (2006.01)

(52) U.S. Cl.
CPC ....... *B41J 2/04541* (2013.01); *B41J 2/04543* (2013.01); *B41J 2/0458* (2013.01)

(58) Field of Classification Search
CPC .. B41J 2/04541; B41J 2/04543; B41J 2/0458; B41J 2/14072
See application file for complete search history.

(56) References Cited

U.S. PATENT DOCUMENTS

| | | | |
|---|---|---|---|
| 4,887,098 | A | 12/1989 | Hawkins et al. |
| 5,400,063 | A | 3/1995 | Kappel |
| 6,231,165 | B1 | 5/2001 | Komuro |

(Continued)

FOREIGN PATENT DOCUMENTS

| | | | |
|---|---|---|---|
| CN | 1480330 | A | 3/2004 |
| CN | 1613648 | A | 5/2005 |

(Continued)

OTHER PUBLICATIONS

Texas Instruments, Precision Analog Applications Seminar, Bridge Measurement Systems, Section 5, date unknown (33 pages).

*Primary Examiner* — Justin Seo
(74) *Attorney, Agent, or Firm* — Foley & Lardner LLP

(57) ABSTRACT

In some examples, a fluidic die includes fluidic actuators, switches, and electrically conductive lines in an electrically conductive layer of the fluidic die. The electrically conductive lines electrically connect the switches to respective actuators. A first dimension of a first electrically conductive line is different from a second dimension of a second electrically conductive line to match a first resistance of the first electrically conductive line having a first length to a second resistance of the second electrically conductive line having a second length different from the first length.

15 Claims, 3 Drawing Sheets

(56) References Cited

U.S. PATENT DOCUMENTS

| | | | | |
|---|---|---|---|---|
| 6,412,917 | B1 | 7/2002 | Torgerson et al. | |
| 6,976,752 | B2 | 12/2005 | Parish et al. | |
| 7,454,836 | B2 | 11/2008 | Furuya | |
| 7,554,417 | B2 | 6/2009 | Takagi | |
| 7,575,294 | B2 | 8/2009 | Imanaka et al. | |
| 2002/0003557 | A1 * | 1/2002 | Miyakoshi | B41J 2/14072 347/50 |
| 2003/0184618 | A1 | 10/2003 | Childers et al. | |
| 2005/0140736 | A1 | 6/2005 | Imanaka et al. | |
| 2005/0157088 | A1 | 7/2005 | Hirayama | |
| 2006/0033780 | A1 | 2/2006 | Ono et al. | |
| 2007/0159266 | A1 | 7/2007 | Riondet et al. | |
| 2009/0195598 | A1 | 8/2009 | Silverbrook | |
| 2009/0302898 | A1 | 12/2009 | Sato et al. | |
| 2009/0315952 | A1 | 12/2009 | Hatsui et al. | |
| 2015/0091960 | A1 | 4/2015 | Nakazawa et al. | |
| 2020/0382089 | A1 | 12/2020 | Flemming et al. | |

FOREIGN PATENT DOCUMENTS

| | | | |
|---|---|---|---|
| CN | 1736715 | A | 2/2006 |
| CN | 101044542 | A | 9/2007 |
| CN | 104512116 | A | 4/2015 |
| EP | 0807522 | A2 | 11/1997 |
| JP | 11-034379 | A | 2/1999 |
| TW | I450494 | B | 8/2014 |
| WO | 2019/050540 | A1 | 3/2019 |
| WO | 2020/106288 | A1 | 5/2020 |
| WO | 2020/222767 | A1 | 11/2020 |

* cited by examiner

MATCHING ELECTRICALLY CONDUCTIVE LINE RESISTANCES TO SWITCHES IN FLUIDIC DIES

CROSS-REFERENCE TO RELATED APPLICATIONS

This application is a U.S. National Stage Patent Application under 35 U.S.C. § 371 of PCT/US2021/012941, filed Jan. 11, 2021, which is hereby incorporated by reference in its entirety.

BACKGROUND

A fluid dispensing system can dispense fluid towards a target. In some examples, a fluid dispensing system can include a printing system, such as a two-dimensional (2D) printing system or a three-dimensional (3D) printing system. A printing system can include printhead devices that include fluidic actuators to cause dispensing of printing fluids.

BRIEF DESCRIPTION OF THE DRAWINGS

Some implementations of the present disclosure are described with respect to the following figures.

Figure 1:
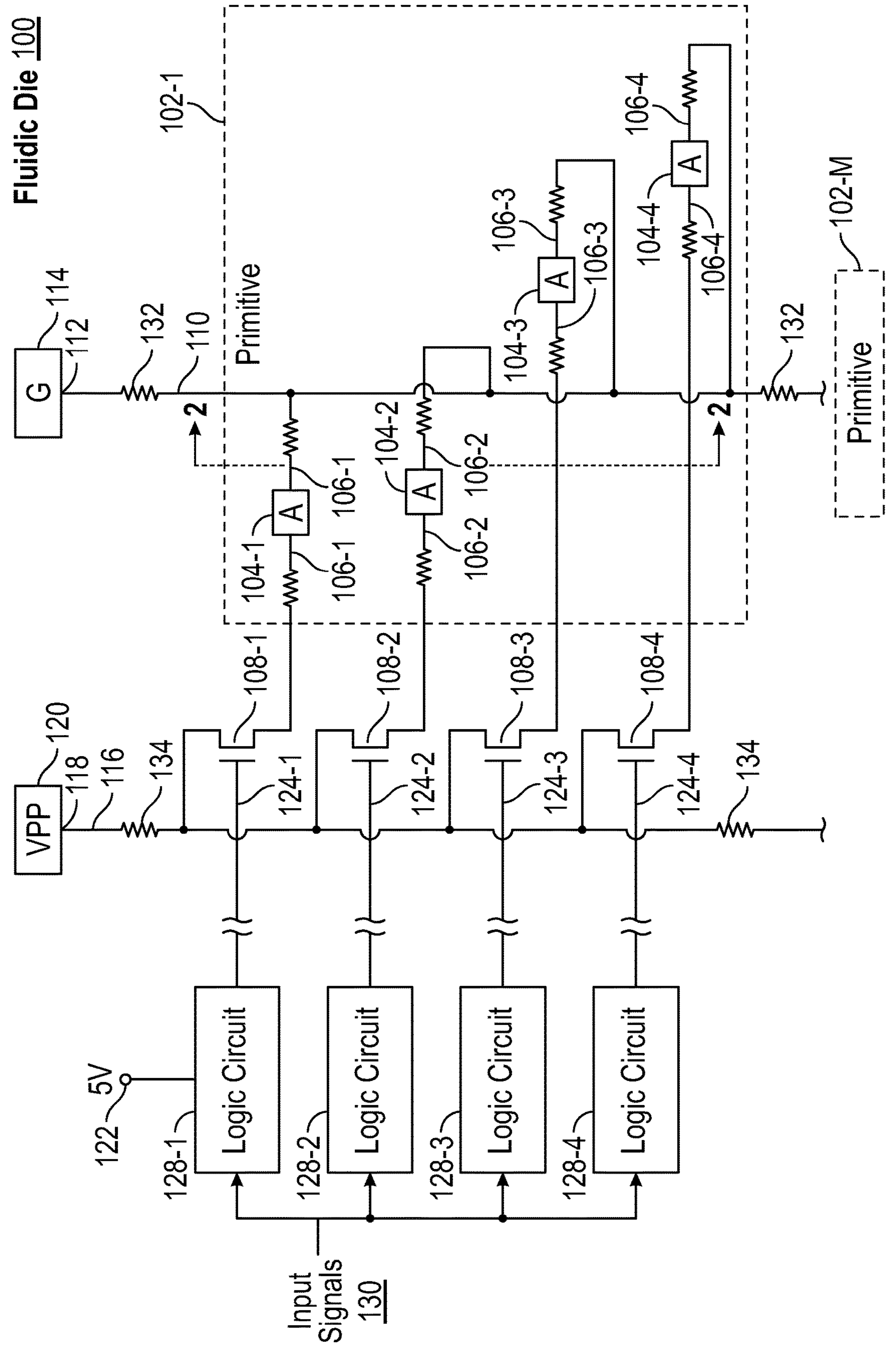
FIG. 1 is a block diagram of a fluidic die including switches, fluidic actuators, and inter-connecting electrically conductive lines that have matched resistances, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as wed, unless the context clearly indicates otherwise. Also, the term "includes," "including," "comprises," "comprising," "have," or "having" when used in this disclosure specifies the presence of the stated elements, but do not preclude the presence or addition of other elements.

A fluid dispensing device can include fluidic actuators that when activated cause dispensing (e.g., ejection or other flow) of a fluid. For example, the dispensing of the fluid can include ejection of fluid droplets by activated fluidic actuators from respective nozzles of the fluid dispensing device. In other examples, an activated fluidic actuator (such as in a pump) can cause fluid to flow through a fluid conduit or fluid chamber. Activating a fluidic actuator to dispense fluid can thus refer to activating the fluidic actuator to eject fluid from a nozzle or activating the fluidic actuator (that is part of a pump, for example) to cause a flow of fluid through a flow structure, such as a flow conduit, a fluid chamber, and so forth.

In some examples, the fluidic actuators include thermal-based fluidic actuators including heating elements, such as resistive heaters. When a heating element is activated, the heating element produces heat that can cause vaporization of a fluid to cause nucleation of a vapor bubble (e.g., a steam bubble) proximate the thermal-based fluidic actuator that in turn causes dispensing of a quantity of fluid, such as ejection from an orifice of a nozzle or flow through a fluid conduit or fluid chamber. In other examples, a fluidic actuator may be a deflecting-type fluidic actuator such as a piezoelectric membrane based fluidic actuator that when activated applies a mechanical force to dispense a quantity of fluid.

In examples where a fluid dispensing device includes nozzles, each nozzle can include an orifice through which fluid is dispensed from a fluid chamber, in response to activation of a fluidic actuator. Each fluid chamber provides the fluid to be dispensed by the respective nozzle. In other examples, a fluid dispensing device can include a microfluidic pump that has a fluid chamber.

Generally, a fluidic actuator can be an ejecting-type fluidic actuator to cause ejection of a fluid, such as through an orifice of a nozzle, or a non-ejecting-type fluidic actuator to cause displacement of a fluid.

A fluid dispensing device can be in the form of a fluidic die. A "die" refers to an assembly where various layers are formed onto a substrate to fabricate circuitry, fluid chambers, and fluid conduits. Multiple fluidic dies can be mounted or attached to a support structure.

In some examples, a fluidic die can be a printhead die, which can be mounted to a print cartridge, a carriage assembly, and so forth. A printhead die includes nozzles through which a printing fluid (e.g., an ink in a 2D printing system, a liquid agent used in a 3D printing system, etc.) can be dispensed towards a target (e.g., a print medium such as a paper sheet, a transparency foil, a fabric, etc., or a print bed including 3D parts being formed by a 3D printing system to build a 3D object).

A fluidic die includes fluidic elements and circuitry that control fluid dispensing operations of the fluidic elements. The circuitry includes logic that is responsive to address signals and control signals to produce output signals that control switches used for activating respective fluidic actuators in the fluid elements.

A switch can be implemented using a transistor or another type of circuit. Generally, a "switch" refers to a circuit element that is controllable by a control signal between multiple states, including a first state in which the switch is deactivated and thus not conducting electrical current, and a second state in which the switch is activated and conducting electrical current. A switch may have intermediate state(s) between the first state and the second state.

A fluidic element includes flow structures that provide for fluid flow in the fluidic element. Examples of flow structures include any or some combination of the following: a fluidic actuator that when activated causes dispensing of a fluid by the fluid element (a fluidic actuator can include a thermal-based fluidic actuator or a deflecting-type fluidic actuator, for example), a fluid chamber that stores a fluid to be dispensed by the fluid element, an orifice through which fluid can pass from the fluid chamber to a region outside the fluid chamber, a fluid feed hole that is used to communicate fluid between a fluid flow conduit and a fluid chamber in the fluid element, a fluid channel to transport fluid, and so forth.

In some examples, fluidic elements can be arranged as an array that includes rows and columns of fluidic elements. In other examples, an array of fluidic elements can have other arrangements, such as arrangements in which lines of fluidic elements extend diagonally across a substrate of a fluidic die, with respect to sides of the fluidic die. A "line" of fluidic elements can refer to a collection of fluidic elements that are arranged along a general direction on the substrate of the fluidic die. The line of fluidic elements can be a straight line, a curved line, or an irregular line, More generally, an array of fluidic elements can have a regular pattern, an irregular pattern, or a random pattern across a substrate of a fluidic die.

A line of fluidic actuators (e.g., a column of fluid actuators in an array) can be connected to a power line and a ground line. A power line includes an electrically conductive line that is used to supply a power voltage (e.g., an elevated power voltage of 32 volts (V) or a different power voltage) for activating fluidic actuators.

A ground line includes an electrically conductive line that is connected to a reference voltage (e.g., a ground or zero voltage or another reference voltage). When a fluidic actuator is connected by an activated switch so that an electrical current can flow through a fluidic actuator from the power line to the ground line, the fluidic actuator is activated to cause dispensing of a fluid.

The power line and ground line are formed using an electrically conductive material, such as a metal or another type of electrically conductive material. Each of the power line and ground line has a parasitic resistance that can cause a voltage drop during operation of fluidic actuators. A parasitic resistance refers to a resistance that is inherently part of an electrically conductive line. An electrical current flowing through the parasitic resistance causes a voltage drop.

A parasitic resistance increases with distance from a termination point of an electrically conductive line, where the termination point can refer to a point of the electrically conductive line that is electrically connected (directly or indirectly) to a power source or ground reference. The termination point of the power line or ground line may be connected to an electrically conductive pad or other structure. The electrically conductive pad can be connected directly or indirectly to the power source or ground reference.

In example fluidic dies that employ a relatively dense arrangement of fluidic elements, there may be parasitic resistance variation along each column of an array of fluidic elements. However, there may not be substantial variation in parasitic resistance along each row of the array. A parasitic resistance variation along a column of fluidic actuators can be referred to as a "vertical" parasitic resistance variation. Parasitic resistance variation along a row of fluidic actuators can be referred to as a "horizontal" parasitic resistance variation. Note that in examples where an array of the fluidic actuators is not in a pattern of rows and columns, a vertical parasitic resistance variation and horizontal parasitic resistance variation may refer to parasitic resistance variation in different directions.

In other examples, a fluidic die may employ a sparse arrangement of fluidic elements. In a sparse arrangement of fluidic elements, the fluidic elements are arranged in patterns of lower density than fluidic elements in a denser arrangement. In a sparse arrangement, there may be substantial horizontal parasitic resistance variation, in addition to vertical parasitic resistance variation. Parasitic resistance variation along a line of fluidic actuators (e.g., a row or column) is considered to be "substantial" if the variation in parasitic resistances of electrically conductive lines connected to a given group (also referred to as a "primitive") of fluidic actuators exceeds a specified threshold (e.g., the lowest parasitic resistance of a first electrically conductive line connected to a first fluidic actuator in the primitive differs from the largest parasitic resistance of a second electrically conductive line connected to a second fluidic actuator in the primitive by greater than the specified threshold). The specified threshold can be an absolute resistance value (expressed as ohms, for example) or a threshold percentage (e.g., the largest parasitic resistance is greater than the lowest parasitic resistance by greater than X ohms, where X is a specified value, or the largest parasitic resistance is greater than the lowest parasitic resistance by Y %).

Horizontal parasitic resistance variation in a sparse arrangement of fluidic elements is caused by different lengths of electrically conductive lines between switches and corresponding fluidic actuators, such as along respective rows. For example, for a given primitive, a first switch can be connected to a first fluidic actuator of the primitive by an electrically conductive line of a first length, a second switch can be connected to a second fluidic actuator of the primitive by an electrically conductive line of a larger second length, and so forth.

Horizontal parasitic resistance variation can cause different amounts of electrical energy to be provided to fluidic actuators within the given primitive of fluidic actuators. Such different amounts of electrical energy delivered to fluidic actuators within the given primitive can cause the fluidic actuators in the given primitive to dispense different amounts of fluid when activated. In a 2D printing system, different amounts of a dispensed printing fluid can cause visible degradation of image quality on a print medium. In a 3D printing system, different amounts of a dispensed liquid agent can cause structural defects in 3D parts formed using the 3D printing system. In other examples where fluidic actuators are used to cause displacement of fluid, such as when the fluid actuators are part of pumps, the different amounts of electrical energy can cause different amounts of fluid to be displaced by the fluidic actuators.

In accordance with some implementations of the present disclosure, multiple electrically conductive lines formed in an electrically conductive layer (e.g., a metal layer or other type of layer) of the fluidic die that electrically connect multiple switches to respective fluidic actuators have cross-sectional dimensions (e.g., widths and/or heights of the electrically conductive lines) tailored to match parasitic resistances of the electrically conductive lines to reduce variation of the parasitic resistances. A "cross-sectional dimension" of an electrical conductive line refers to a dimension of the electrically conductive line that is generally perpendicular (to within manufacturing tolerances) to an axis of the length of the electrically conductive line. For example, the electrically conductive line can have a length, a width, and a height, in examples where the electrically conductive line has a generally rectangular cross section (to within manufacturing tolerances). The width and height extend along respective axes of the electrically conductive line that are generally perpendicular (to within manufacturing tolerances) to the axis of the length of the electrically conductive line. In other examples, if the electrically conductive line does not have a generally rectangular cross section, then the electrically conductive line can have a different cross-sectional dimension (e.g., a diameter for an electrically conductive line with a generally circular cross section) that is generally perpendicular to the axis of the length of the electrically conductive line.

"Matching" a first parasitic resistance of a first electrically conductive line to a second parasitic resistance of a second electrically conductive line refers to causing the first and second parasitic resistances to be within a specified tolerance of one another (e.g., to within 20%, to within 10%, to within 5% to within 2%, to within 1%, and so forth).

FIG. 1 is a block diagram of a portion of a fluidic die 100 according to some implementations of the present disclosure. In the ensuing discussion, reference is made to an array of fluidic elements that has rows and columns of fluidic elements. FIG. 1 shows fluidic actuators arranged into primitives 102-1 to 102-M, where M≥2. In the example of FIG. 1, each primitive 102-*i*, i=1 to M, includes four fluidic actuators. In other examples, a primitive can include a different number of fluidic actuators.

The primitive 102-1 includes four fluidic actuators 104-1, 104-2, 104-3, and 104-4. In some examples, the fluidic actuators 104-1 to 104-4 can include respective resistive heaters, deflecting elements, and so forth.

An electrically conductive line 106-1 electrically connects the fluidic actuator 104-1 between a switch 108-1 and a ground line 110. An electrically conductive line 106-2 electrically connects the fluidic actuator 104-2 between a switch 108-2 and the ground line 110. An electrically conductive line 106-3 electrically connects the fluidic actuator 104-3 between a switch 108-3 and the ground line 110. An electrically conductive line 106-4 electrically connects the fluidic actuator 104-4 between a switch 108-4 and the ground line 110.

A termination point 112 of the ground line 110 can be electrically connected to an electrically conductive pad (or other structure) 114 that is electrically connected (directly or indirectly) to a ground reference voltage. In further examples, the ground line 110 can have multiple termination points connected to respective electrically conductive pads (or other structures) that are electrically connected (directly or indirectly) to the ground reference voltage.

In examples according to FIG. 1, the switches 108-1 to 108-4 are implemented using transistors, such as field effect transistors (FETs). A source of each transistor 108-*j* (j=1 to 4) is connected to a respective electrically conductive line 106*j*. The drain of the transistor 108-*j* is connected to a power line 116.

Note that the terms "drain" and "source" of a transistor can be interchangeably used. For example, the source of a transistor 108-*j* can be connected to the power line 116, while the drain of the transistor 108-*j* can be electrically connected to an electrically conductive line 106-*j*.

The switches 108-1 to 108-4 arranged in the manner depicted in FIG. 1 are high-side switches in which a node of each switch is directly connected to the power line 116. In alternative examples, the switches 108-1 to 108-4 can be arranged as low-side switches, in which a node of each switch (e.g., a source of a transistor) is directly connected to the ground line 110, and each fluidic actuator 104-*j* is connected between the other node of the switch 108-*j* (e.g., a drain of a transistor) and the power line 116. In further examples, there may be other arrangements of connections of the switches 108-1 to 108-4 and the fluidic actuators 104-1 to 104-4 between the power line 116 and the ground line 110.

A termination point 118 of the power line 116 is electrically connected to a high-voltage power pad (or other structure) 120, which is electrically connected (directly or indirectly) to a power source. The high-voltage power pad (or other structure) 120 can be at an elevated power voltage, such as 32 V or a different elevated voltage. In further examples, the power line 116 can have multiple termination points connected to respective electrically conductive pads (or other structures) that are electrically connected (directly or indirectly) to the power source.

The gate of a transistor 108-*j* is connected to a control signal 124-*i* (124-1 to 124-4 shown) that is produced based on the output of a logic circuit 128-*j* that receives various input signals 130. For example, the input signals 130 can include primitive data (which includes an address corresponding to the fluidic actuator that is to be activated), a fire signal that controls a timing of the activation of the fluidic actuator, and so forth. The logic circuits 128-1 to 128-4 are powered by a low-voltage power voltage 122 (labelled "5V"). The low-voltage power voltage 122 can be at 5 V or a different low voltage.

For the primitive 102-1, the lengths of the electrically conductive lines 106-1, 106-2, 106-3, and 106-4 that connect respective fluidic actuators 104-1, 104-2, 104-3, and 104-4 between corresponding switches 108-1, 108-2, 108-3, and 108-4 and the ground line 110 are different from each other. For example, the electrically conductive line 106-1 has a first length, the electrically conductive line 106-2 has a second length, the electrically conductive line 106-3 has a third length, and the electrically conductive line 106-4 has a fourth length, where the first length is less than the second length, the second length is less than the third length, and the third length is less than the fourth length. Thus, the parasitic resistance of the electrically conductive line 106-4 is the largest parasitic resistance in the primitive 102-1, while the parasitic resistance of the electrically conductive line 106-1 is the lowest parasitic resistance in the primitive 102-1.

The fluidic actuators of the primitive 102-M are connected to respective switches and the ground line 110 in similar fashion as the fluidic actuators 104-1 to 104-4 of the primitive 102-1.

In accordance with some implementations of the present disclosure, the parasitic resistances (represented by resistor symbols in FIG. 1) of electrically conductive fines are matched to one another by varying cross-sectional dimensions of the corresponding electrically conductive lines. For example, since the length of the electrically conductive line 106-4 is the largest and the length of the electrically conductive line 106-1 is the smallest in the primitive 102-1, the cross-sectional dimension of the electrically conductive line 106-4 is set to be the largest from among the electrically conductive lines 106-1 to 106-4, while the cross-sectional dimension of the electrically conductive line 106-1 is set to be the smallest from among the electrically conductive lines of the primitive 102-1. The cross-sectional dimension of the electrically conductive line 106-3 is smaller than that of the electrically conductive line 106-4, and the cross-sectional dimension of the electrically conductive line 106-2 is smaller than that of the electrically conductive line 106-3 but larger than that of the electrically conductive line 106-1.

As shown in FIG. 1, along each column, there is a parasitic resistance associated with each of the power line 116 and the ground line 110, The ground line has a vertical parasitic resistance represented by 132, and the power line 116 has a vertical parasitic resistance represented by 134. The parasitic resistance increases for primitives that are farther away from the respective termination point 112 or 118 of the ground line 110 or 118. Note that there may be multiple termination points for each of the ground line 110 and power line 116.

To compensate for the increased parasitic resistance of primitives that are farther away from a termination point of the ground line 110 or power line 116, an over-energy is applied to the entire column of fluidic actuators so that in the worst-case firing condition (associated with fluidic actuators that are farthest away from a termination point), sufficient energy is provided to such farthest fluidic actuators to activate successfully. Due to the over-energy, the fluidic actuators that are closest to a termination point receive more energy than have to be supplied to activate such fluidic actuators. Over-energy to a given fluidic actuator can be achieved by increasing the amount of time that a switch to the given fluidic actuator is turned on. A longer active time duration of a switch means that more energy is supplied to a respective fluidic actuator.

Figure 2A:
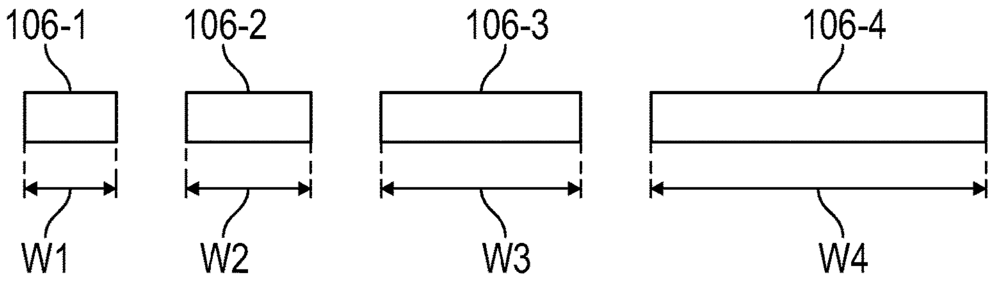
FIGS. 2A-2C are cross-sectional views of electrically conductive lines with different cross-sectional dimensions, according to some examples.

FIG. 2A is a cross-sectional view of the electrically conductive lines at 106-1 to 106-4 taken along section 2-2 in FIG. 1. In the example of FIG. 2A, the cross-sectional dimension of the electrically conductive lines 106-1 to 106-4 that is varied is the width of the electrically conductive lines. The height of the electrically conductive lines 106-1 to 106-4 are generally the same (to within manufacturing tolerances). In FIG. 2A, the electrically conductive line 106-1 has a first width W1, the electrically conductive line 106-2 has a second width W2, the electrically conductive line 106-3 has a third width W3, and the electrically conductive line 106-4 has a fourth width W4, where $W1<W2<W3<W4$. The different widths W1, W2, W3, and W4 are set based on the respective different lengths of the electrically conductive lines 106-1 to 106-4, to match the parasitic resistances of the electrically conductive lines 106-1 to 106-4. For example, the electrically conductive line 106-1 has the width W1 and a length L1, which causes the electrically conductive line 106-1 to have a first parasitic resistance R1; the electrically conductive line 106-2 has the width W2 and a length L2, which causes the electrically conductive line 106-2 to have a second parasitic resistance R2; the electrically conductive line 106-3 has the width W3 and a length L3, which causes the electrically conductive line 106-1 to have a third parasitic resistance R3; and the electrically conductive line 106-4 has the width W4 and a length L4, which causes the electrically conductive line 106-4 to have a fourth parasitic resistance R4. The parasitic resistances R1, R2, R3, and R4 are matched to one another based on the adjustments of the widths W1, W2, W3, and W4 when the fluidic die 100 is fabricated.

Figure 2B:
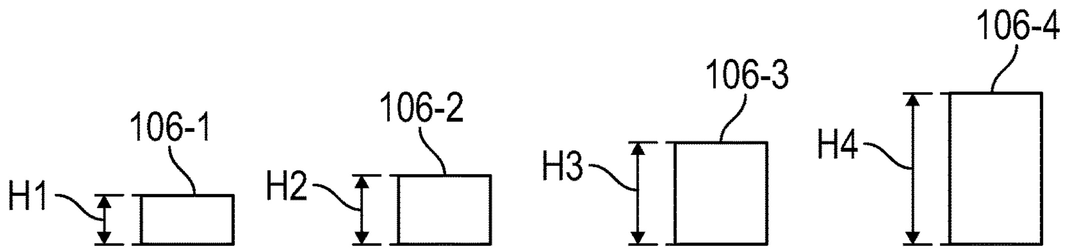

FIG. 2B is a cross-sectional view of the electrically conductive lines at 106-1 to 106-4 taken along section 2-2 in FIG. 1. FIG. 2B shows a different example in which the cross-sectional dimension of the electrically conductive lines 106-1 to 106-4 that is varied is the height of each electrically conductive line. For example, the electrically conductive line 106-1 has a first height H1, the electrically conductive line 106-2 has a second height H2, the electrically conductive line 106-3 has a third height H3, and the electrically conductive line 106-4 has a fourth height H4, where $H1<H2<H3<H4$. The different widths H1, H2, H3, and H4 are set based on the respective different lengths of the electrically conductive lines 106-1 to 106-4, to match the parasitic resistances of the electrically conductive lines 106-1 to 106-4.

Figure 2C:
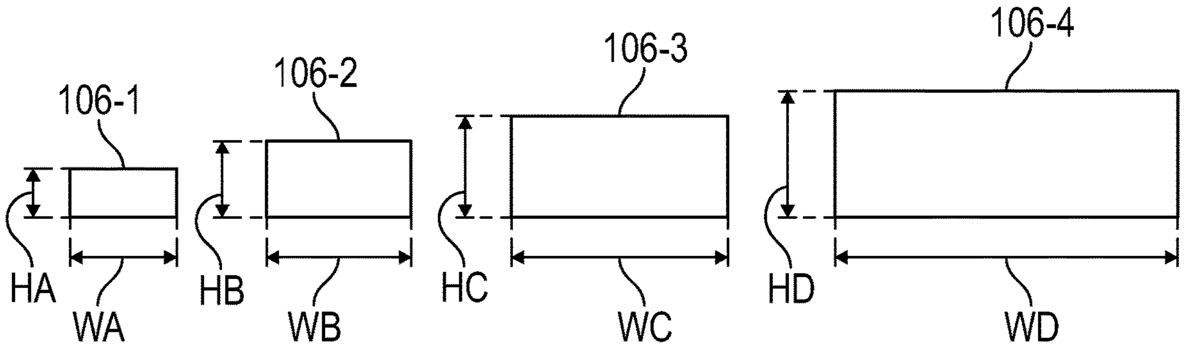

FIG. 2C is a cross-sectional view of the electrically conductive lines at 106-1 to 106-4 taken along section 2-2 in FIG. 1. FIG. 2B shows another example in which the cross-sectional dimensions that are varied for the electrically conductive lines 106-1 to 106-4 include both the width and height of each electrically conductive line. In FIG. 2C, the electrically conductive line 106-1 has a first width WA and a first height HA, the electrically conductive line 106-2 has a second width WB and a second height HB, the electrically conductive line 106-3 has a third width WC and a third height HC, and the electrically conductive line 106-4 has a fourth width WD and a fourth height HD, where $WA<WB<WC<WD$ and $HA<HB<HC<HD$. The widths WA, WB, WC, and WD and the heights HA, HB, HC, and HD are set to match the parasitic resistances of the electrically conductive lines 106-1 to 106-4.

By matching the parasitic resistances of electrically conductive lines for fluidic actuators within each primitive, defects associated with uneven dispensing of fluid by fluidic actuators are reduced or eliminated. By balancing the parasitic resistances of the electrically conductive lines, the electrical energy delivered to each fluidic actuator within a given primitive becomes more uniform. With less variation in the electrical energy, the over-energy that has to be applied to compensate for vertical parasitic resistances can be reduced, which can help reduce energy consumption of the fluidic die 100 and reduce the overall heat of a fluidic die 100 during operation.

Figure 3:
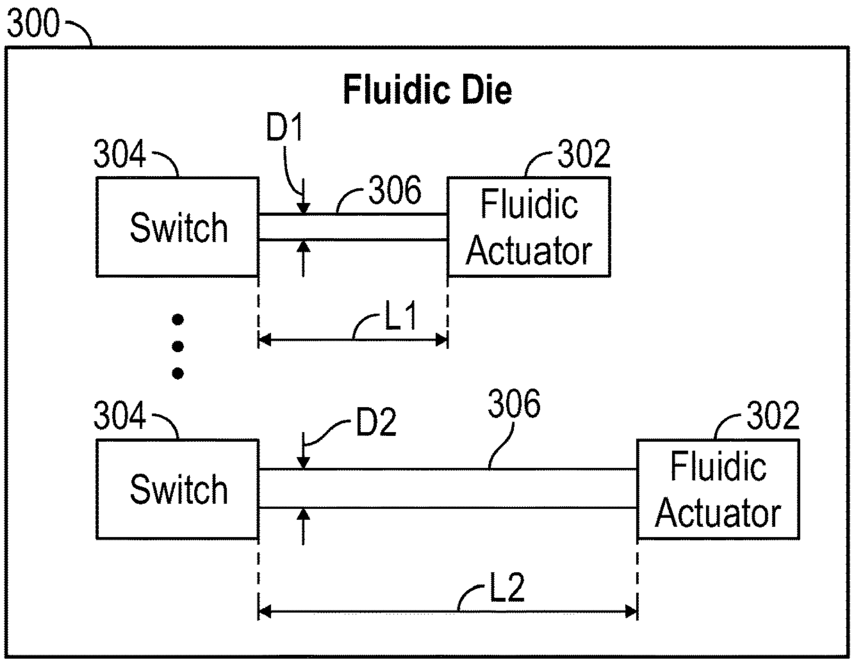
FIG. 3 is a block diagram of a fluidic die according to further examples.

FIG. 3 is a block diagram of a fluidic die 300 according to some examples. The fluidic die 300 includes multiple fluidic actuators 302, multiple switches 304 (e.g., transistors), and multiple electrically conductive lines 306 in an electrically conductive layer (e.g., metal layer) of the fluidic die 300. The electrically conductive lines 306 electrically connect the switches 304 to respective fluidic actuators 302. A first dimension (D1) of a first electrically conductive line of the electrically conductive lines 306 is different from a second dimension (D2) of a second electrically conductive line of the electrically conductive lines 306 to match a first resistance of the first electrically conductive line having a first length (L1) to a second resistance of the second electrically conductive line having a second length (L2) different from the first length (L1).

In some examples, the switches 304 are to provide activation signals from the switches 304 to the respective fluidic actuators 302 over respective electrically conductive lines 306. In some examples, a switch 304 when activated connects a power voltage to a respective fluidic actuator 302.

In some examples, a given electrically conductive line 306 is between a node of a given switch 304 (e.g., a drain or source of a transistor) and a ground line (e.g.; 110 in FIG. 1) or a power line (e.g.; 116 in FIG. 1).

In some examples, the given electrically conductive line 306 includes a first segment between the node of the given switch 304 and a first node of a given fluidic actuator 302, and a second segment between a second node of the given fluidic actuator 302 and the ground line 110 or the power line 116.

In some examples, the multiple fluidic actuators 302 may be part of a primitive. The fluidic die 300 may include fluidic actuators arranged into multiple primitives, where each primitive includes plural fluidic actuators.

Figure 4:
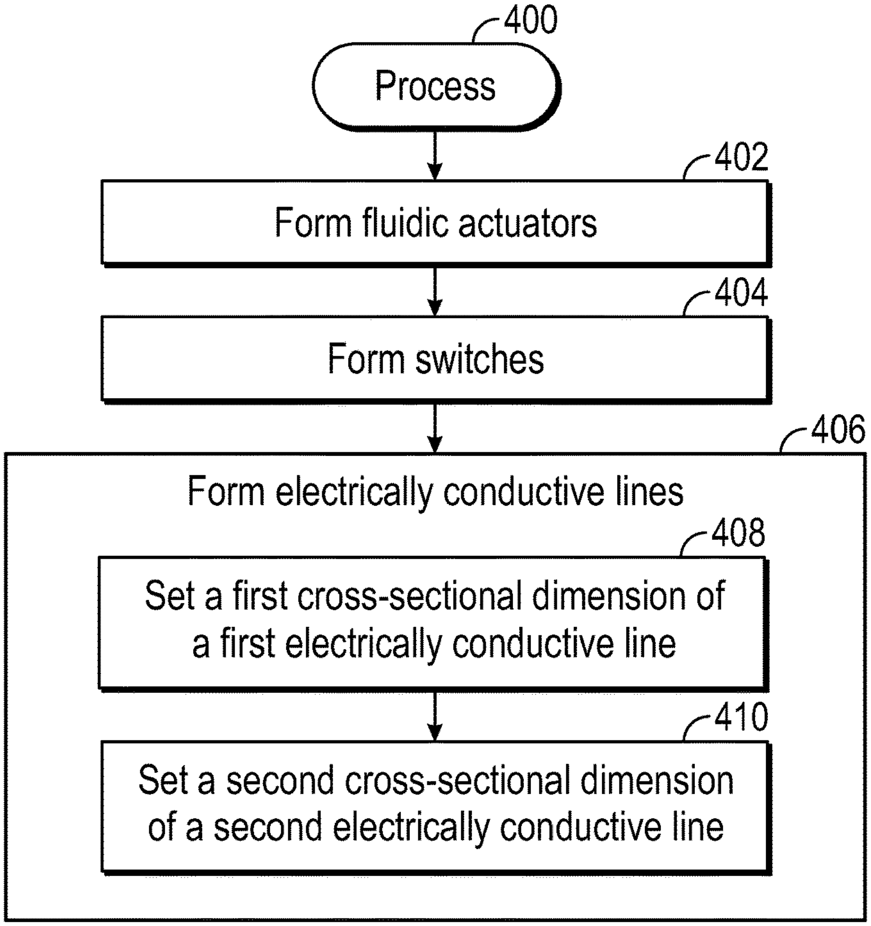
FIG. 4 is a flow diagram of a process of forming a fluidic die, according to some examples.

FIG. 4 is a flow diagram of a process 400 of forming a fluidic die according to some examples. The process 400 includes forming (at 402) fluidic actuators on a substrate, and forming (at 404) switches. The process 400 further includes forming (at 406), in an electrically conductive layer on the substrate, electrically conductive lines that electrically connect the switches to respective fluidic actuators. Forming the electrically conductive lines includes setting (at 408) a first cross-sectional dimension of a first electrically conductive line of the electrically conductive lines, and setting (at 410) a second cross-sectional dimension of a second electrically conductive line of the electrically conductive lines, where the first cross-sectional dimension is different from the second cross-sectional dimension to match a first resistance of the first electrically conductive line having a first length to a second resistance of the second electrically conductive line having a second length different from the first length.

Note that the tasks of the process 400 can be performed in an order different from that shown in FIG. 4. Note that an example fabrication flow can include forming switches, followed by forming electrically conductive lines and concurrently forming fluidic actuators.

In the foregoing description, numerous details are set forth to provide an understanding of the subject disclosed herein. However, implementations may be practiced without some of these details, Other implementations may include modifications and variations from the details discussed above. It is intended that the appended claims cover such modifications and variations.

What is claimed is:

1. A fluidic die comprising:

a plurality of fluidic actuators;

a plurality of switches; and a plurality of electrically conductive lines in an electrically conductive layer of the fluidic die, the plurality of electrically conductive lines to electrically connect the plurality of switches to respective fluidic actuators of the plurality of fluidic actuators, wherein the plurality of electrically conductive lines have a substantially constant height across different lines of the plurality of electrically conductive lines, and wherein a first dimension of a first electrically conductive line of the plurality of electrically conductive lines is different from a second dimension of a second electrically conductive line of the plurality of electrically conductive lines wherein the first electrically conductive line and the second electrically conductive line are connected to respective fluidic actuators within a primitive and wherein parasitic resistances of the first electrically conductive line and the second electrically conductive line are balanced within the primitive in order to match a first resistance of the first electrically conductive line having a first length to a second resistance of the second electrically conductive line having a second length different from the first length, wherein the first dimension and the second dimension comprise widths of the respective electrically conductive lines.

2. The fluidic die of claim 1, wherein the plurality of switches are to provide activation signals from the plurality of switches to the respective fluidic actuators over respective electrically conductive lines of the plurality of electrically conductive lines.

3. The fluidic die of claim 1, wherein the first electrically conductive line is between a node of a first switch of the plurality of switches and a ground line or a power line.

4. The fluidic die of claim 3, wherein the first electrically conductive line comprises a first segment between the node of the first switch and a first node of a first fluidic actuator of the plurality of fluidic actuators, and a second segment between a second node of the first fluidic actuator and the ground line or the power line.

5. The fluidic die of claim 4, wherein the first switch when activated causes connection of the first fluidic actuator between a power voltage and a ground reference.

6. The fluidic die of claim 1, comprising a plurality of primitives, wherein the plurality of fluidic actuators are part of a first primitive of the plurality of primitives, and each primitive of the plurality of primitives comprises multiple fluidic actuators.

7. The fluidic die of claim 6, wherein a third dimension of a third electrically conductive line of the plurality of electrically conductive lines is different from each of the first dimension and the second dimension, wherein the third electrically conductive line is connected to a respective fluidic actuator within the first primitive and wherein a parasitic resistance of the third electrically conductive line is balanced with the first resistance and the second resistance within the first primitive, in order to match a third resistance of the third electrically conductive line having a third length to the first resistance and the second resistance, wherein the third length is different from each of the second length and the first length, and wherein the third dimension comprises a width of the third electrically conductive line.

8. The fluidic die of claim 7, wherein parasitic resistances of the plurality of electrically conductive lines connected to the respective fluidic actuators in the first primitive are balanced in the first primitive.

9. The fluidic die of claim 1, wherein the first dimension is a first width of the first electrically conductive line, and the second dimension is a second width of the second electrically conductive line.

10. The fluidic die of claim 1, wherein the first dimension is a first height of the first electrically conductive line, and the second dimension is a second height of the second electrically conductive line.

11. The fluidic die of claim 1, wherein the plurality of switches comprise a plurality of transistors.

12. A fluidic die comprising:

a plurality of fluidic actuators, wherein the plurality of fluidic actuators are arranged into a plurality of primitives, each primitive comprising multiple fluidic actuators;

a plurality of switches to provide power to respective fluidic actuators of the plurality of fluidic actuators, wherein distances between the respective fluidic actuators and corresponding switches of the plurality of switches are different; and a plurality of electrically conductive lines in an electrically conductive layer of the fluidic die, the plurality of electrically conductive lines to electrically connect the plurality of switches to the respective fluidic actuators, wherein the plurality of electrically conductive lines have a uniform, substantially constant height across different lines of the plurality of electrically conductive lines, and wherein cross-sectional dimensions of respective electrically conductive lines, within a primitive, of the plurality of electrically conductive lines are different, wherein parasitic resistances of electrically conductive lines connected to respective fluidic actuators within each primitive are balanced within that primitive in order to match the respective parasitic resistances, wherein the cross-sectional dimensions comprise widths of the respective electrically conductive lines.

13. The fluidic die of claim 12, wherein the cross-sectional dimensions of the respective electrically conductive lines comprise widths of the respective electrically conductive lines, or heights of the respective electrically conductive lines, or both the widths and the heights of the respective electrically conductive lines.

14. A method of forming a fluidic die, comprising:

forming a plurality of fluidic actuators on a substrate, wherein the plurality of fluidic actuators are arranged into a plurality of primitives, each primitive comprising multiple fluidic actuators;

forming a plurality of switches; and forming, in an electrically conductive layer on the substrate, electrically conductive lines that electrically connect the plurality of switches to respective fluidic actuators of the plurality of fluidic actuators, wherein forming the electrically conductive lines comprises:

forming the electrically conductive lines to have a substantially constant height across different lines of the electrically conductive lines, setting a first cross-sectional dimension of a first electrically conductive line of the electrically conductive lines, and setting a second cross-sectional dimension of a second electrically conductive line of the electrically conductive lines, wherein the first cross-sectional dimension is different from the second cross-sectional dimension wherein the difference in cross-sectional dimensions balances parasitic resistances of electrically conductive lines connected to respective fluidic actuators within each primitive in order to match a first resistance of the first electrically conductive line having a first length to a second resistance of the second electrically conductive line having a second length different from the first length, wherein the first cross-sectional dimension and the second cross-sectional dimension comprise widths of the respective electrically conductive lines.

15. The method of claim 14, wherein the first length of the first electrically conductive line corresponds to a first distance between a first switch of the plurality of switches and a first fluidic actuator of the plurality of fluidic actuators, and wherein the second length of the second electrically conductive line corresponds to a second distance between a second switch of the plurality of switches and a second fluidic actuator of the plurality of fluidic actuators, wherein the first distance is different from the second distance.

* * * * *